Jan. 28, 1969    D. D. KELLER    3,424,967
MOTOR DRIVE UNIT WITH SEMICONDUCTOR
CONTROLLED SPEED AND TORQUE
Filed May 19, 1966    Sheet 1 of 2

INVENTOR:
DONALD D. KELLER
BY Homer R. Montague
ATTORNEY

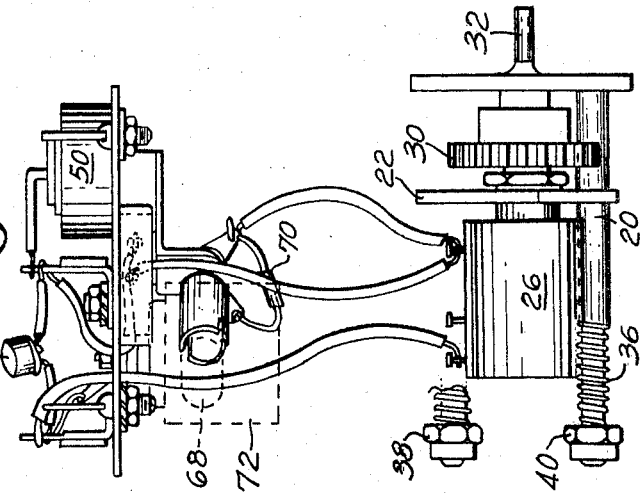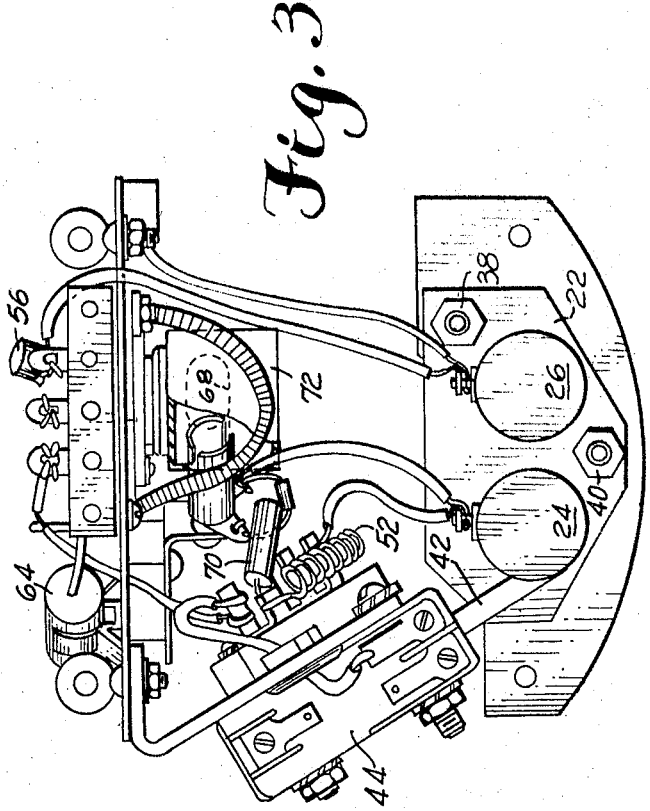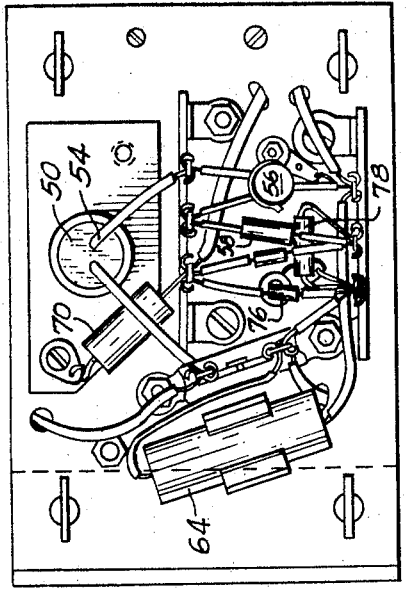

United States Patent Office 3,424,967
Patented Jan. 28, 1969

3,424,967
MOTOR DRIVE UNIT WITH SEMICONDUCTOR
CONTROLLED SPEED AND TORQUE
Donald D. Keller, Bourbon, Ind., assignor to Orthopedic
Equipment Company, Inc., a corporation of Indiana
Filed May 19, 1966, Ser. No. 551,374
U.S. Cl. 318—345                              7 Claims
Int. Cl. H02p 5/12, 5/36, 7/24, 7/58

ABSTRACT OF THE DISCLOSURE

A speed and torque control for an electric motor supplied from an AC source, including an incandescent lamp whose brightness responds to supply current variations through an SCR in the supply circuit, and a light-dependent resistor illuminated by the lamp, said resistor controlling the firing circuit of the SCR; ganged variable resistors provide for adjustment of the torque-speed relationship.

---

This invention pertains to motor drive units, and especially to electric drive units which must operate over a very extended speed range and with close control of the output torque throughout such extended range.

The drive unit of the invention was especially designed for use by orthopedic surgeons, whose operations may range from a requirement for bone sawing, especially internal bone sawing which may require a speed of the order of 8,500 r.p.m., to bone drilling or reaming at speeds as low as 100 r.p.m. Even where the latter output speed is obtained through a gear reduction unit at the output chuck handle, with a step-down ratio of 10 to 1, the total motor shaft speed range remains very large. Previous efforts to provide such a range have involved heavy and elaborate variable speed mechanical transmissions, which are also inadequate to maintain a limiting torque value throughout the range.

Another disadvantage of previous designs of drive units for surgical use has been the necessity for providing an explosion-proof design, as required in all surgical operating rooms. The present invention provides a unit which is relatively light and compact, so that it can be suspended 5 feet or more above floor level (above which explosive gases do not rise), and so arranged that complete control is readily and safely accomplished by the surgeon, as by a flexible shaft terminating near the output chuck at the operating site. This arrangement simplifies the operations considerably, and is of value in many other applications of power units of this type.

More specifically, the invention provides a motor speed and torque control utilizing solid-state electronic components conveniently mounted within an extension of the motor casing for great simplicity and compactness, together with a control assembly allowing both on-off and speed-torque control to be accomplished by diverse motions of a single control shaft or the like. For example, the on-off control may be actuated by the axial movement of a shaft whose rotational adjustment also controls the speed of the drive unit. The setting of the speed control simultaneously adjusts the torque characteristic at that speed level, the torque being sensed electronically in terms of the current drawn by the motor, and which current thereby controls the degree of illumination of a lamp that is thereupon sensed by a light-dependent resistor which in turn controls the firing point of a silicon controlled rectifier which is in the motor supply circuit. The circuit arrangement also includes safety provisions to protect the electronic components against extreme conditions which may be encountered, particularly during the turn-on period if the speed control happens to be set at the top of its range.

While the invention will be described herein particularly with reference to the surgical purposes mentioned above, it will be recognized that the invention is not limited to that field.

For example, the feature of torque control would be of value wherever for safety, or other reasons, machinery, conveyors or the like should be torque-limited in the event of blockage, encountering personnel or equipment, and so on. Also, the invention is applicable in a general way in situations wherein the normal torque characteristic of electric motors (torque increasing with speed) must be modified to provide torque limitation at any speed or throughout a range of speeds.

FIG. 1 of the accompanying drawings is a pictorial view showing mechanical features of the electric motor control arrangement by which the motor output is regulated.

FIG. 3 is an end view of the construction shown in FIG. 1.

FIG. 4 is a top view of an electronic sub-assembly seen in side view in FIG. 3.

FIG. 5 is a fragmentary side view of FIG. 3.

Figure 1:
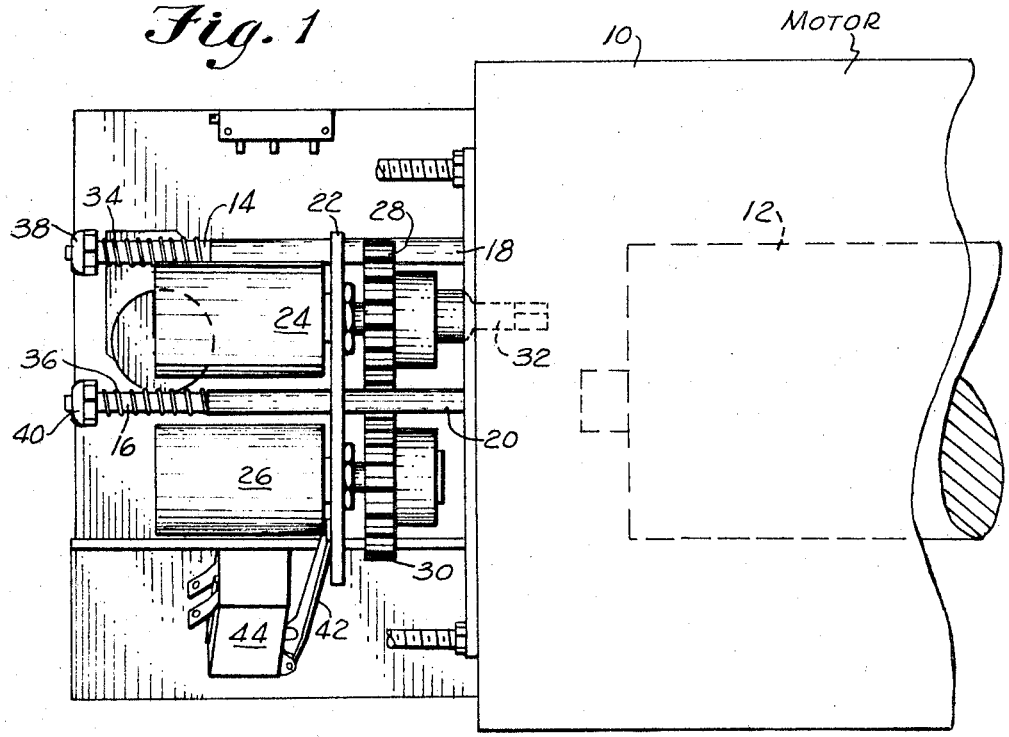

Referring first to FIG. 1 of the drawings, numeral 10 designates the electric drive motor, usually in a cylindrical casing and of conventional DC motor or commutator-type AC/DC construction, its armature being indicated generally at numeral 12. The mechanical output shaft and chuck are not shown, but would lie to the right of the portion of the motor casing indicated, and may include a fixed-ratio gearing depending upon the output speed desired. The control unit of the invention is shown as suitably secured on the left end face of motor 10, and normally covered by an auxiliary end bell (not shown) secured to the motor casing.

A pair of guide rods 14 and 16 are secured to the motor casing, and slidable along them are sleeves 18 and 20 which carry a support plate 22 on which are mounted two adjustable resistors 24 and 26, whose control shafts are connected by gears 28 and 30 so that they rotate together. Secured to gear 28 is a shaft extension 32 which will ultimately be coupled to a flexible shaft or Bowden cable passing through the motor casing for control by the user. In the case of a surgical drive unit, this control shaft will normally extend clear to the region of the output chuck which is connected to the motor output shaft by a flexible power shaft.

Rotation of shaft 32 is utilized to control the electronic components to regulate both motor speed and motor torque. Also, leftward axial pressure on shaft 32 will move the plate 22 to the left against the restoring force of springs 34 and 36 which surround the guide rods 14 and 16, between the ends of tubes 18 and 20 and the nuts 38 and 40 threaded on the ends of the rods. This leftward motion of plate 22 is utilized to operate the arm 42 of a conventional microswitch 44 and thus to turn the power supply on when the drive unit is to be used.

Figure 2:
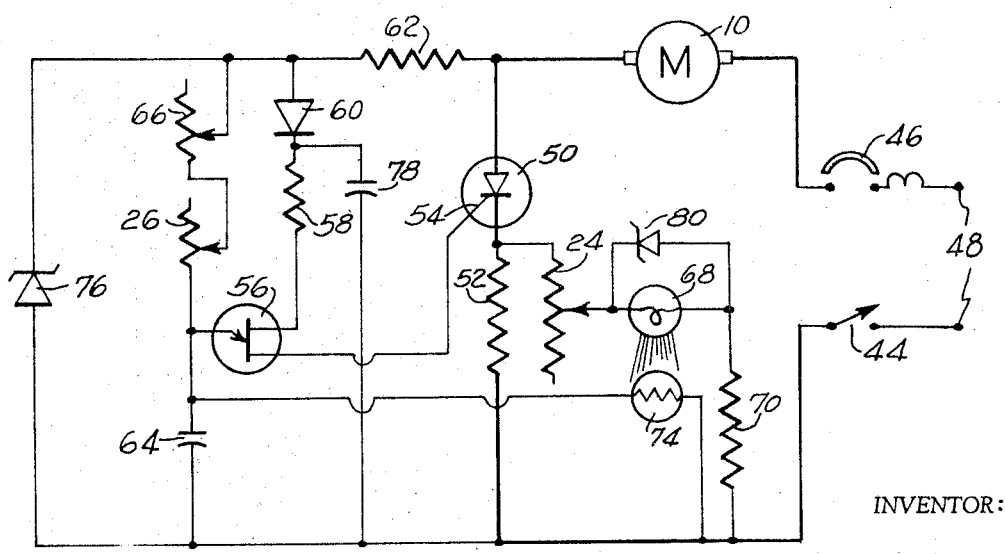
FIG. 2 is a schematic wiring diagram of the arrangement.

FIG. 2 shows schematically the novel circuit arrangement of the invention. The motor as a whole is again denominated by the numeral 10 and is energized through the main line switch 46 which may be of the thermal protection type, from AC supply terminals 48, typically at 115 volts and 60 c.p.s. The microswitch 44 is indicated, purely by way of example, as in series with the other supply terminal. The main motor energizing circuit is readily traced from the left terminal of motor 10, through the anode-cathode path of the silicon controlled rectifier 50, fixed current-limiting resistor 52, and back to the lower supply terminal via switch 44. Current to the motor flows whenever the SCR 50 is fired under the control of its gate electrode 54, the firing current being supplied by the unijunction transistor 56 whose base terminals complete the circuit to SCR gate 54 through resistor 58, diode 60 and resistor 62 from the SCR anode. The firing instant of the unijunction transistor 56 (and hence of SCR 50) is controlled by a time constant circuit including capacitor 64 and the series-connected resistors 26 and 66, the emitter of the UJT being connected between resistor 26 and capacitor 64.

When the AC supply wave makes the left-hand terminal of resistor 62 slightly positive, current flows through resistors 66 and 26 to charge up capacitor 64. At some point in this charging cycle, the voltage at the emitter electrode of UJT 56 becomes sufficient to turn it "on," discharging the capacitor through the gate electrode of the SCR 50 and (since its anode is also positive at this time) causing it to conduct. During the remainder of the positive half cycle of supply voltage, full motor drive current is supplied through the SCR and the low-value current measuring resistor 52.

In the absence of any other circuitry, the point in each positive half cycle of supply voltage at which the SCR 50 starts conducting would thus be set by the total resistance of 66 and 26. The resistor 26, as already described, is adjusted manually by shaft 32 to select the desired speed, and the additional resistor 66 is made adjustable (as by a screw driver adjustment) to provide an adjustable upper limit for the maximum speed that can be selected by the user.

In order to provide a torque control responsive to the mechanical output of motor 10, a portion of the load voltage determined by the drop across resistor 52 is applied to a series circuit including the adjustable resistor 24, an incandescent lamp 68, and resistor 70. Since substantially full motor current is flowing through measuring resistor 52 (whose resistance is much lower than the minimum resistance in the shunt path through the lamp), the voltage applied to the lamp will vary directly with the load, and hence with motor torque output. The luminous output of the lamp, however, will increase very rapidly with increase in lamp supply voltage, furnishing a highly sensitive torque-responsive phenomenon.

Mounted adjacent the lamp 68, and preferably as shown in a common opaque housing 72 (FIGS. 1, 3 and 5) with the lamp 68, is the light dependent resistor 74, such as a commercial type LDR–25 whose resistance varies with its illumination. This resistor is connected across capacitor 64, and hence forms a current path in parallel therewith which increases the time required for the latter to charge up to the specified firing voltage at the emitter of UJT 56. Hence the firing point of the UJT is under the joint control of the speed selecting resistance 26 and the motor torque or load sensed by lamp 68. When the motor load approaches a value which is set by the adjustment of resistor 24, the speed control 26 is effectively over-ridden, and the mechanical interconnection or "ganging" of controls 24 and 26 allows the speed to be selected only in a range not exceeding the value at which the desired maximum torque is delivered.

Putting the matter in commoner language, the light sensing circuit constantly monitors the torque load on the motor, and acts to prevent the motor from being energized a any level in excess of the predetermined limit. Below this limiting value, the speed is independently selectable by the user. Since the SCR 50 effectively controls the RMS voltage applied to the motor, by determining the portion of each positive half cycle during which it conducts, this control not only protects the tool or object being worked on, but by limiting the energy delivered to the motor, it protects the latter against overload as well. In fact, the motor can be left in a permanently stalled but energized condition indefinitely without damage.

The diode 60, Zener diode 76 and capacitor 78 protect the UJT against spurious firing due to transients which occur as a result of the sudden conduction and cutoff of the SCR 50, as well as against transients produced during the negative half cycles of the supply voltage. The Zener diode 80 and dropping resistor 70 similarly protect the incandescent lamp 68 from excessive voltage when the motor is started at a high speed setting of shaft 32.

The invention has been described herein in connection with a preferred embodiment, but it is to be understood that the principles of the invention can be applied equally well to other embodiments. For example, while the invention is shown as applied by way of preference to a commutator type motor, in principle at least it can also be used to control a suitably rated AC motor, such as an induction motor. The reference to lack of necessity for explosion-proofing of the motor is not to be taken as a requirement that would prevent the use of the ideas herein in connection with motors that are independently rendered explosion-proof. In addition, while operation from AC supply mains is described, there is no reason why, with suitable modifications (well known to those skilled in the art) to provide for periodic turning off of the controlled rectifier, the main current supply cannot be direct current. These and other variations of an obvious nature are intended to be included within the scope of the appended claims.

What is claimed is:
1. An electric-powered mechanical drive unit having an interrelated speed and output torque control, comprising:
   (a) a drive motor connected to an AC supply circuit through a semiconductor controlled rectifier and a series load-circuit resistor,
   (b) a firing circuit for said rectifier including a first variable resistance for setting the firing angle of said rectifier,
   (c) an incandescent lamp connected in series with a second variable resistance and across said load-circuit resistor,
   (d) a light-dependent resistor positioned for exposure to light from said lamp, and connected to said firing circuit to affect the firing action thereof conjointly with the control exercised by said first variable resistance, and
   (e) manual control means connected for concomitant ganged adjustment of both of said variable resistances.

2. A drive unit in accordance with claim 1, and an on-off supply circuit switch connected for control by said manual control means.

3. A drive unit in accordance with claim 1, in which said firing circuit includes a unijunction transistor.

4. A drive unit in accordance with claim 3, in which said transistor has its emitter connected to one side of the supply circuit through said first variable resistance.

5. A drive unit in accordance with claim 1, in which said firing circuit includes an adjustable range-limit setting resistor in series with said first variable resistance.

6. A drive unit in accordance with claim 1, in which components (b), (c) and (d) are mounted on an end plate of said drive motor.

7. A drive unit in accordance with claim 6, in which said manual control means includes a rotatable shaft extending into the housing of said drive motor, for connection to a control shaft passing through said housing.

References Cited

UNITED STATES PATENTS

| 3,328,662 | 6/1967 | Gambill | 318—313 |
| 3,349,309 | 10/1967 | Dannettell | 318—332 X |
| 3,366,862 | 1/1968 | Beck et al. | 318—313 |

ORIS L. RADER, *Primary Examiner.*

G. SIMMONS, *Assistant Examiner.*

U.S. Cl. X.R.

318—313, 332, 432, 480